United States Patent
Izawa et al.

(10) Patent No.: US 11,448,923 B2
(45) Date of Patent: Sep. 20, 2022

(54) LIQUID CRYSTAL DISPLAY PANEL AND LIQUID CRYSTAL MODULE

(71) Applicants: Panasonic Liquid Crystal Display Co., Ltd., Himeji (JP); Pasona Knowledge Partner Inc., Osaka (JP)

(72) Inventors: Keisuke Izawa, Osaka (JP); Makoto Arita, Hyogo (JP); Toshitaka Uchikoba, Hyogo (JP)

(73) Assignees: PANASONIC LIQUID CRYSTAL DISPLAY CO., LTD., Hyogo (JP); PASONA KNOWLEDGE PARTNER INC., Osaka (JP)

(*) Notice: Subject to any disclaimer, the term of this patent is extended or adjusted under 35 U.S.C. 154(b) by 0 days.

(21) Appl. No.: 17/374,620

(22) Filed: Jul. 13, 2021

(65) Prior Publication Data

US 2022/0019102 A1   Jan. 20, 2022

(30) Foreign Application Priority Data

Jul. 14, 2020 (JP) .............................. JP2020-120484

(51) Int. Cl.
G02F 1/1339 (2006.01)
G02F 1/1335 (2006.01)

(52) U.S. Cl.
CPC .... *G02F 1/13392* (2013.01); *G02F 1/133514* (2013.01)

(58) Field of Classification Search
None
See application file for complete search history.

(56) References Cited

U.S. PATENT DOCUMENTS

2020/0064674 A1\* 2/2020 Higashiyama ........ G02F 1/1339
2021/0397044 A1\* 12/2021 Hu .................... G02F 1/133602

FOREIGN PATENT DOCUMENTS

JP    2015-114375    6/2015

\* cited by examiner

*Primary Examiner* — Richard H Kim
(74) *Attorney, Agent, or Firm* — Hamre, Schumann, Mueller & Larson, P.C.

(57) ABSTRACT

A liquid crystal display panel to be used in a vertical orientation includes: a first substrate; a second substrate located opposite to the first substrate; and a liquid crystal layer disposed between the first substrate and the second substrate. When a position of a top end of the liquid crystal layer is defined as a first position and a position of a bottom end of the liquid crystal layer is defined as a second position when the liquid crystal display panel is placed in the vertical orientation, a distance between the first substrate and the second substrate when the liquid crystal panel is in a horizontal orientation gradually decreases from the first position to the second position.

9 Claims, 10 Drawing Sheets

LIQUID CRYSTAL DISPLAY PANEL AND LIQUID CRYSTAL MODULE

CROSS REFERENCE TO RELATED APPLICATION

The present application is based on and claims priority of Japanese Patent Application No. 2020-120484 filed on Jul. 14, 2020. The entire disclosure of the above-identified application, including the specification, drawings and claims is incorporated herein by reference in its entirety.

FIELD

The present disclosure relates to a liquid crystal display panel and a liquid crystal module having the liquid crystal display panel.

BACKGROUND

Liquid crystal display panels have excellent characteristics, such as low profile, light weight, and low power consumption. Therefore, liquid crystal display devices having liquid crystal display panels are widely used in various applications. For example, liquid crystal display devices are used for television sets, monitors, tablet terminals or the like, or digital signage in public spaces of railway infrastructure or the like or in commercial facilities.

Such a liquid crystal display device has a liquid crystal display panel and a backlight. The liquid crystal display panel and the backlight is incorporated in the liquid crystal display device as a liquid crystal module.

As a liquid crystal display panel incorporated in the liquid crystal display device, a liquid crystal display panel of the active matrix driving type that includes a plurality of thin-film transistors (TFTs) is known. The liquid crystal display panel of the active matrix driving type includes a TFT substrate on which a TFT is provided for each pixel as a switching element, an opposed substrate opposed to the TFT substrate, and a liquid crystal layer disposed between the TFT substrate and the opposed substrate. The liquid crystal display panel configured as described above displays an image by controlling the optical transmittance of the liquid crystal layer on a pixel basis using a pixel electrode provided for each pixel (see PTL 1, for example).

CITATION LIST

Patent Literature

PTL 1: Japanese Unexamined Patent Application Publication No. 2015-114375

SUMMARY

Technical Problem

The liquid crystal display device is often placed in a vertical orientation with the display screen in the landscape orientation. In such a case, the liquid crystal display panel incorporated in the liquid crystal display device is also in the vertical orientation. That is, the liquid crystal display panel is used in the vertical orientation in which the liquid crystal display panel stands upright.

However, as the liquid crystal display panel is continuously used in the vertical orientation, the liquid crystal of the liquid crystal layer in the liquid crystal display panel flows down in the vertical direction by gravity. As a result, the cell gap of the liquid crystal display panel is greater in lower parts than in upper parts, and a chromaticity difference occurs between upper parts and lower parts of the image displayed on the display screen of the liquid crystal display panel. In other words, a chromaticity variation occurs between upper parts and lower parts of the image displayed on the display screen. Specifically, lower parts of the image displayed on the display screen look more yellowish than upper parts.

Figure 11:
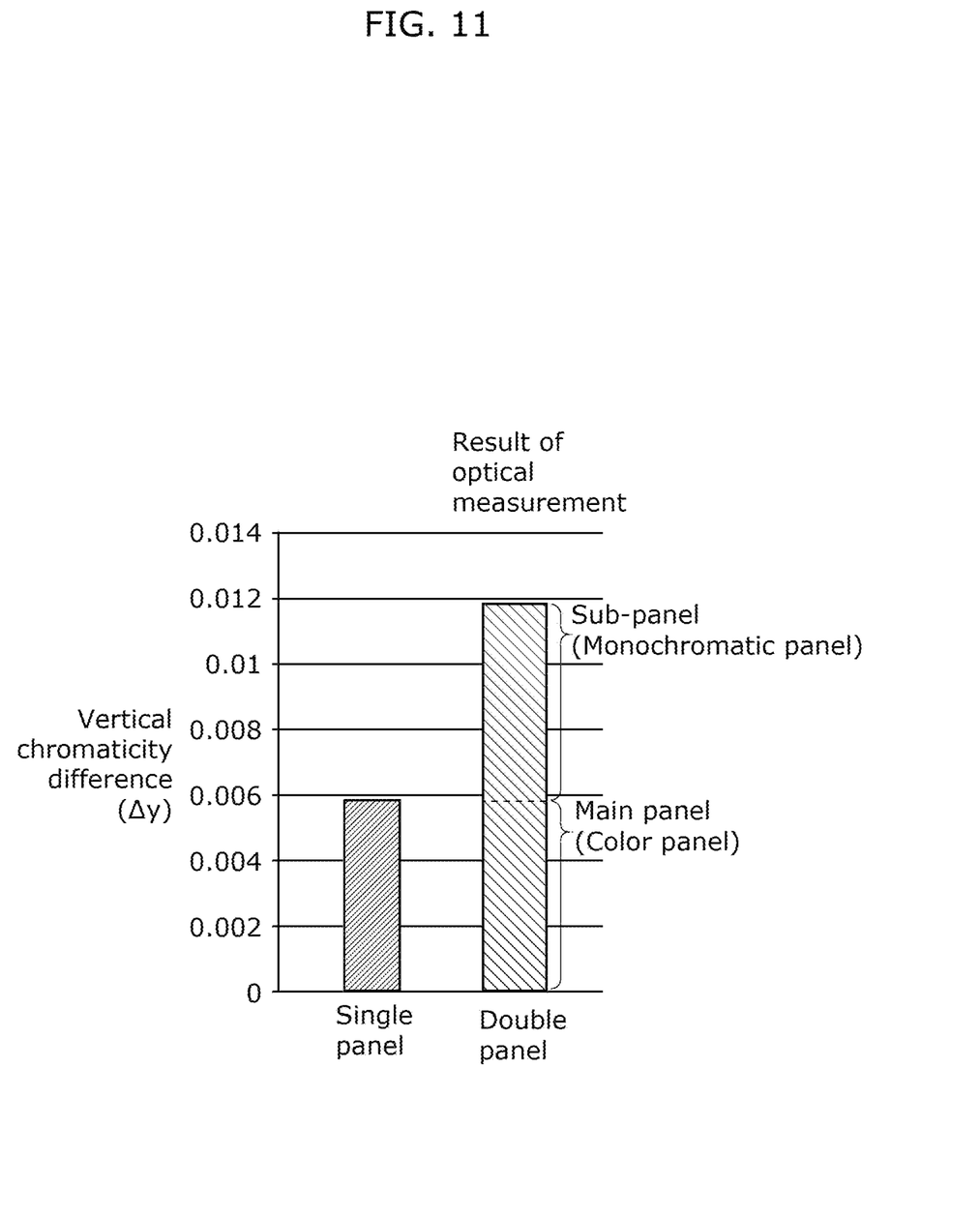
FIG. 11 is a diagram showing a result of optical measurement of the chromaticity difference between upper parts and lower parts of an image displayed on a display screen of each of a liquid crystal display device having one liquid crystal display panel and a liquid crystal display device having two liquid crystal display panels.

In particular, with a liquid crystal display device ("double panel" in FIG. 11) that includes a stack of a liquid crystal display panel serving as a main panel and a liquid crystal display panel serving as a subpanel for higher contrast display as shown in FIG. 11, the chromaticity variations of the two liquid crystal display panels are summed. That is, the liquid crystal display device having two liquid crystal display panels has an amount of chromaticity variation that is about twice greater than that of a liquid crystal display device ("single panel" in FIG. 11) that includes one liquid crystal display panel. FIG. 11 shows a result of optical measurement of the chromaticity difference between upper parts and lower parts of an image displayed on a display screen of each of a liquid crystal display device having one liquid crystal display panel and a liquid crystal display device having two liquid crystal display panels.

As described above, a conventional liquid crystal display panel has a problem that a chromaticity variation occurs in an image when the liquid crystal display panel is used in the vertical orientation.

The present disclosure is conceived to solve the problem and has as an object to provide a liquid crystal display panel and a liquid crystal module that can prevent a chromaticity variation from occurring in an image when the liquid crystal display panel and the liquid crystal module are used in a vertical orientation.

Solution to Problem

A liquid crystal display panel according to an aspect of the present disclosure is a liquid crystal display panel to be used in a vertical orientation, and includes: a first substrate; a second substrate located opposite to the first substrate; and a liquid crystal layer disposed between the first substrate and the second substrate, wherein when a position of a top end of the liquid crystal layer is defined as a first position and a position of a bottom end of the liquid crystal layer is defined as a second position when the liquid crystal display panel is placed in the vertical orientation, a distance between the first substrate and the second substrate when the liquid crystal panel is in a horizontal orientation gradually decreases from the first position to the second position.

Furthermore, a liquid crystal module according to an aspect of the present disclosure includes: the above-described liquid crystal display panel; and a backlight disposed behind the liquid crystal display panel, wherein the liquid crystal display panel comprises a plurality of liquid crystal display panels, the plurality of liquid crystal display panels include a first liquid crystal display panel and a second liquid crystal display panel disposed between the first liquid crystal display panel and the backlight, the first liquid crystal display panel displays a colored image, and the second liquid crystal display panel displays a monochromatic image.

Furthermore, a liquid crystal module according to another aspect of the present disclosure includes: the above-described liquid crystal display panel; and a backlight disposed behind the liquid crystal display panel, wherein the liquid crystal display panel comprises a plurality of liquid crystal display panels, the plurality of liquid crystal display panels include a first liquid crystal display panel and a second liquid crystal display panel disposed between the first liquid crystal display panel and the backlight, the first liquid crystal display panel displays monochromatic image, and the second liquid crystal display panel displays a monochromatic image.

Advantageous Effects

The present disclosure can prevent chromaticity variation from occurring in an image displayed on a liquid crystal display panel when the liquid crystal display is used in a vertical orientation.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Exemplary embodiments of the present disclosure will be described below. It should be noted that each of the subsequently described embodiments shows one specific example of the present disclosure. The numerical values, shapes, materials, structural components, and the arrangement and connection of the structural components, etc., shown in the following embodiments are mere examples, and thus are not intended to limit the present disclosure. Therefore, among the structural components described in the following embodiments, structural components not recited in any one of the independent claims are described as optional structural components.

Each of the figures is a schematic diagram, and is not necessarily a precise illustration. Therefore, the scales in the respective figures are not necessarily uniform. It should be noted that, in the figures, components that are substantially the same are given the same numerical signs, and overlapping description may be omitted or simplified.

In this specification and the drawings, the X-axis, the Y-axis, and the Z-axis are three axes of a three-dimensional orthogonal coordinate system. In the exemplary embodiments, the Z-axis direction is the vertical direction, and the directions perpendicular to the Z-axis (directions parallel to the XY plane) are the horizontal directions. The X-axis and the Y-axis are axes that are perpendicular to each other and are perpendicular to the Z-axis. Note that the arrows of the X-axis, the Y-axis, and the Z-axis indicate the positive directions along the respective axes.

Embodiment 1

Figure 1:
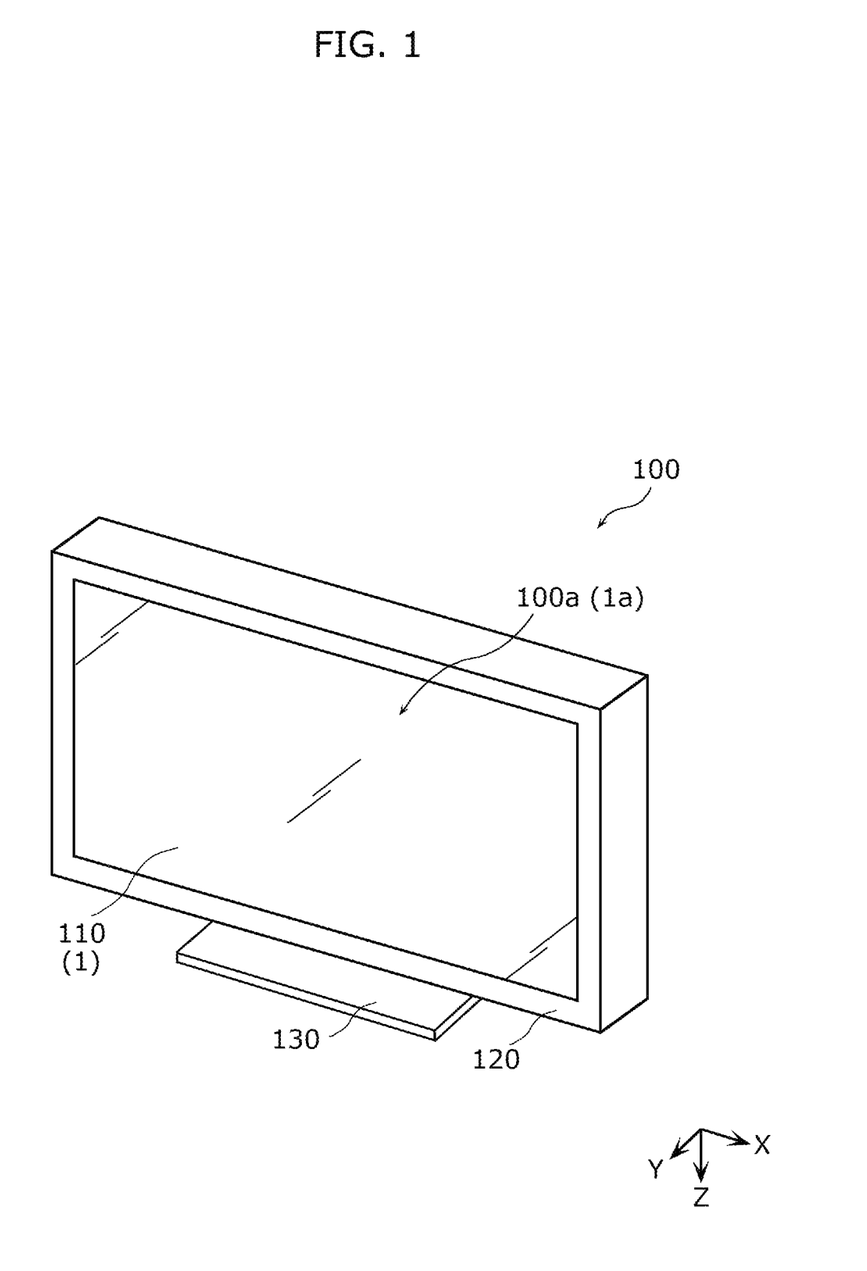
FIG. 1 is a perspective view of a liquid crystal display device according to Embodiment 1.
Figure 2:
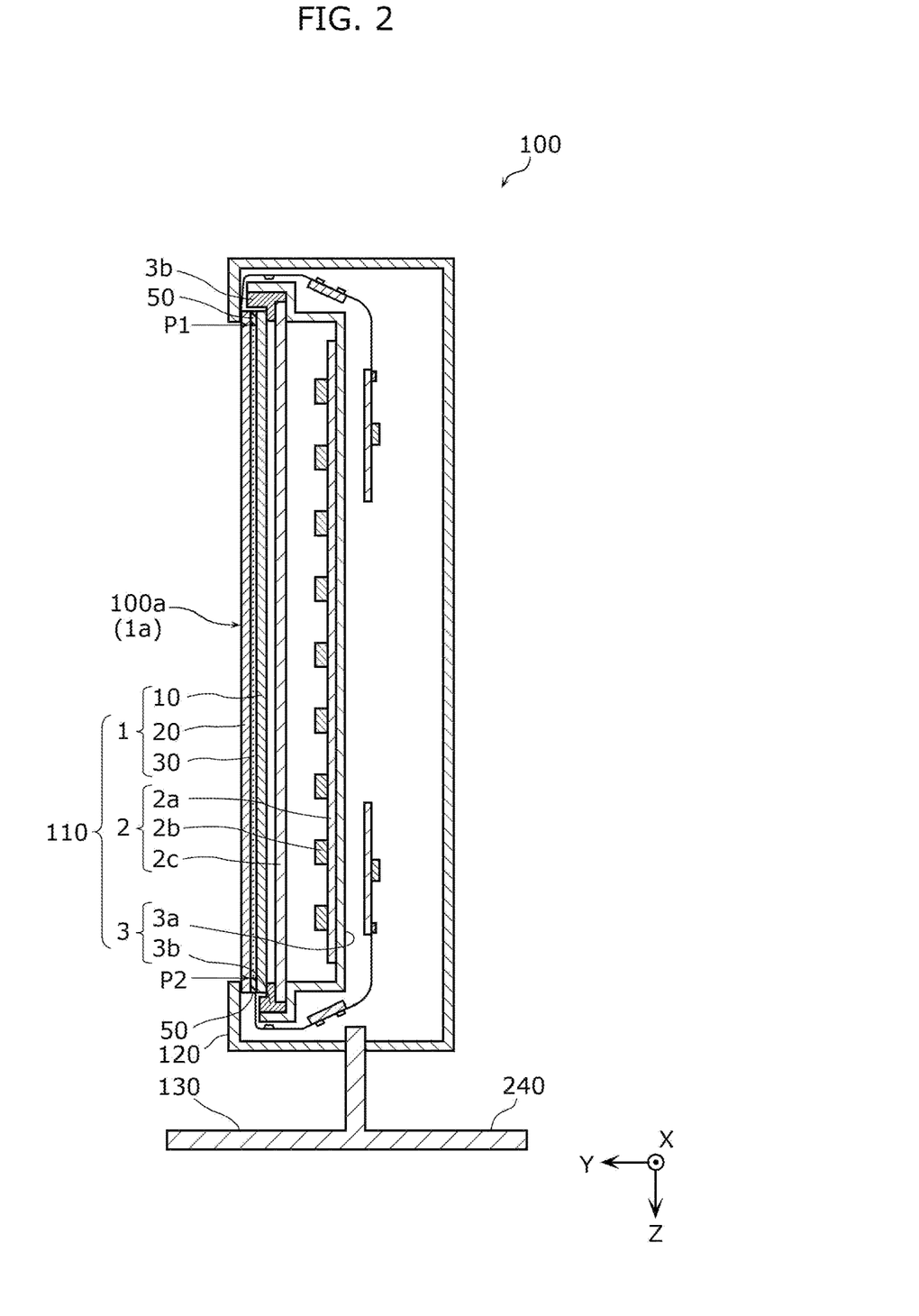
FIG. 2 is a cross-sectional view of the liquid crystal display device according to Embodiment 1.
Figure 3:
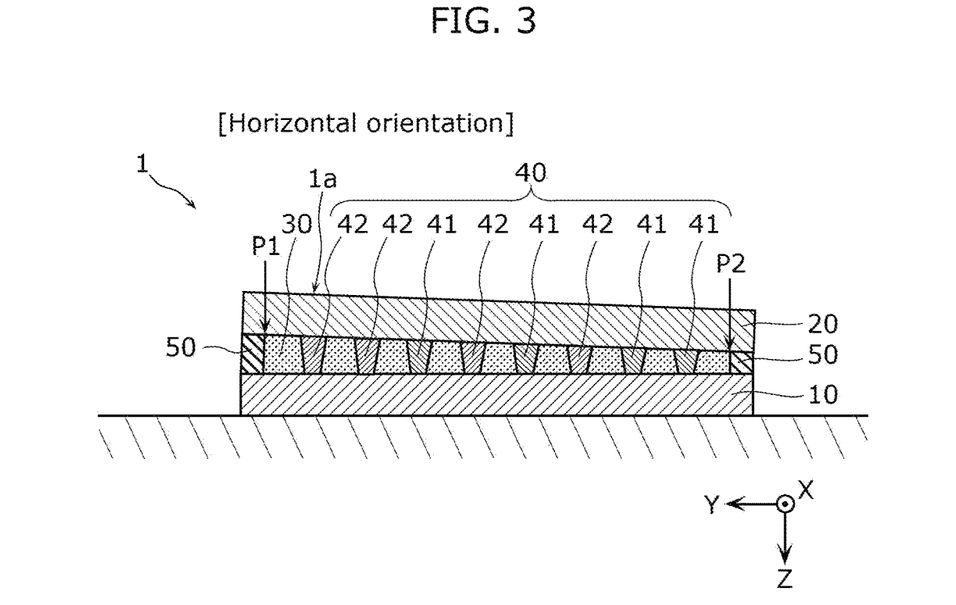
FIG. 3 is a cross-sectional view of a liquid crystal display panel used for the liquid crystal display device according to Embodiment 1.
Figure 4:
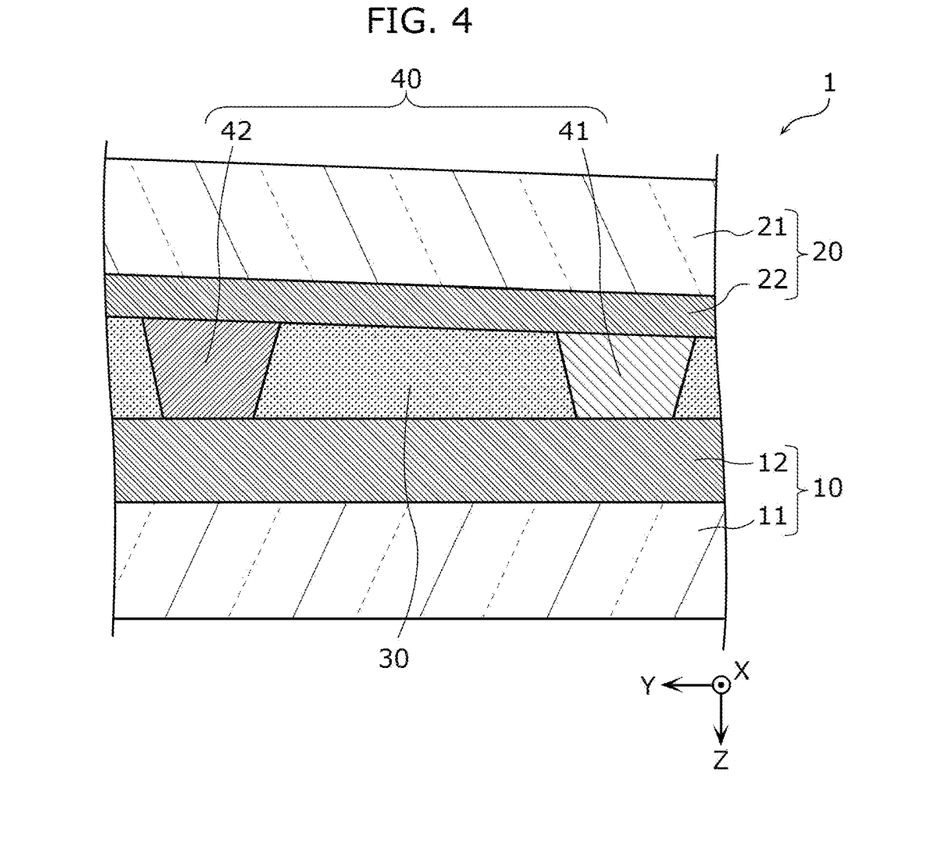
FIG. 4 is an enlarged cross-sectional view of the liquid crystal display panel according to Embodiment 1.

First, a configuration of liquid crystal display device 100 according to Embodiment 1 will be described with reference to FIGS. 1 to 4. FIG. 1 is a perspective view of liquid crystal display device 100 according to Embodiment 1. FIG. 2 is a cross-sectional view of liquid crystal display device 100. FIG. 3 is a cross-sectional view of liquid crystal display panel 1 used for liquid crystal display device 100. FIG. 4 is an enlarged cross-sectional view of liquid crystal display panel 1. Note that FIGS. 3 and 4 show liquid crystal display panel 1 placed in a horizontal orientation on a horizontal plane that has a perpendicular line extending in the vertical direction. Specifically, in FIG. 3, liquid crystal display panel 1 is placed on a horizontal plane with display screen 1a thereof facing up. The horizontal plane is a work surface, a floor surface, or the ground, for example.

As shown in FIGS. 1 and 2, liquid crystal display device 100 includes liquid crystal module 110 having liquid crystal display panel 1, housing 120 that houses liquid crystal module 110, and stand 130 that supports housing 120. Housing 120 and stand 130 may be made of resin or metal.

As shown in FIG. 1, liquid crystal display device 100 is installed in a vertical orientation with display screen 100a facing in the horizontal direction. Therefore, as shown in FIG. 2, liquid crystal display panel 1 mounted on liquid crystal display device 100 is also in the vertical orientation with display screen 1a facing in the horizontal direction. In this way, liquid crystal display device 100 and liquid crystal display panel 1 are used in the vertical orientation in which they stand upright.

Both display screen 100a of liquid crystal display device 100 and display screen 1a of liquid crystal display panel 1 have a rectangular shape. In this embodiment, liquid crystal display device 100 and liquid crystal display panel 1 are placed in the landscape orientation so that the long sides of display screens 100a and 1a are parallel to the horizontal direction. However, the present disclosure is not limited thereto, and liquid crystal display device 100 and liquid crystal display panel 1 may be placed in the portrait orientation so that the long sides of display screens 100a and 1a are parallel to the vertical direction. Note that display screen 1a of liquid crystal display panel 1 serves as display screen 100a of liquid crystal display device 100.

As shown in FIGS. 1 and 2, liquid crystal module 110 includes liquid crystal display panel 1, backlight 2, and frame 3. That is, liquid crystal display panel 1, backlight 2, and frame 3 are integrated as liquid crystal module 110 and incorporated in liquid crystal display device 100.

Liquid crystal display panel 1 is disposed on a light-emitting side of backlight 2. Therefore, light emitted by backlight 2 is incident on liquid crystal display panel 1. Liquid crystal display panel 1 displays an image (video), such as a still image or a moving image, with the incident light from backlight 2. Specifically, liquid crystal display panel 1 displays a color image or a monochromatic image. In this embodiment, liquid crystal display panel 1 displays a color image.

Note that, although the driving mode of liquid crystal display panel 1 is the horizontal electric field mode, such as the In Plane Switching (IPS) mode or the Fringe Field Switching (FFS) mode, the Vertical Alignment (VA) mode or the Twisted Nematic (TN) mode can also be used, for example. Voltage control of Liquid crystal display panel 1, which is of the horizontal electric field mode, is performed in the normally black mode, for example. However, the mode of voltage control of liquid crystal display panel 1 is not limited to the normally black mode.

An image display area of display screen 1a of liquid crystal display panel 1 is a display area (effective area) in which an image is displayed, and is formed by a plurality of pixels arranged in a matrix, for example. The image display area of display screen 1a is a rectangular area, for example. In this embodiment, since liquid crystal display panel 1 displays a color image, the plurality of pixels in the image display area includes a red pixel, a green pixel, and a blue pixel. Note that display screen 1a includes a frame area (peripheral area) having a rectangular frame shape that surrounds the image display area as an ineffective area with no image displayed.

As shown in FIG. 2 to FIG. 4, liquid crystal display panel 1 includes first substrate 10, second substrate 20 opposed to first substrate 10, liquid crystal layer 30 disposed between first substrate 10 and second substrate 20, and a plurality of spacers 40 for maintaining the distance between first substrate 10 and second substrate 20. First substrate 10, second substrate 20, and liquid crystal layer 30 disposed therebetween form a liquid crystal cell.

For example, first substrate 10 is disposed on the rear side, which is the side toward backlight 2, and second substrate 20 is disposed on the front side. Note that second substrate 20 may be disposed on the rear side, and first substrate 10 may be disposed on the front side.

First substrate 10 is a TFT substrate on which a plurality of TFTs is formed. Specifically, as shown in FIG. 4, first substrate 10 includes first transparent substrate 11, and TFT layer 12 formed on first transparent substrate 11. TFT layer 12 is formed on a principal plane of first transparent substrate 11 that is on the side toward liquid crystal layer 30.

First transparent substrate 11 is a transparent base material, such as a glass substrate or a transparent resin substrate. In this embodiment, first transparent substrate 11 is a glass substrate.

TFT layer 12 includes a TFT disposed for each of the plurality of pixels, and various kinds of wiring for driving the TFTs. In TFT layer 12, for example, a plurality of gate wires and a plurality of source wires perpendicular to the plurality of gate wires are formed as the wiring. TFT layer 12 includes a plurality of metal layers in which wires made of a metal material are formed, a plurality of interlayer insulating layers formed between the plurality of metal layers, and a semiconductor layer.

In TFT layer 12, a planarized film is formed as one of the interlayer insulating layers. A pixel electrode and a common electrode opposed to the pixel electrode are formed on the planarized film of TFT layer 12, in order to apply a voltage to liquid crystal layer 30. For example, on the planarized layer, a common electrode is formed for all the pixels, and a pixel electrode is formed for each pixel on an insulating layer on the common electrode. The pixel electrodes and the common electrode are transparent electrodes made of indium tin oxide (ITO), for example.

Second substrate 20 is an opposed substrate disposed to be opposed to first substrate 10. In this embodiment, since liquid crystal display panel 1 displays a color image, second substrate 20 is a color filter substrate (CF substrate) on which a color filter is formed. Specifically, as shown in FIG. 4, second substrate 20 includes second transparent substrate 21 and color filter layer 22 formed on second transparent substrate 21. Color filter layer 22 is formed on a principal plane of second transparent substrate 21 that is on the side toward liquid crystal layer 30.

Second transparent substrate 21 is a transparent base material, such as a glass substrate or a transparent resin substrate. In this embodiment, second transparent substrate 21 is a glass substrate, as with first transparent substrate 11.

Color filter layer 22 has a color filter and a black matrix. The black matrix is a black light-shielding layer formed between the pixels, and is made of carbon black, for example. The color filter is formed for each of the plurality of pixels. Specifically, as the color filters, a red color filter, a green color filter, and a blue color filter are formed for the red pixel, the green pixel, and the blue pixel, respectively. Each color filter is formed in an area surrounded by the black matrix (that is, in an opening in the black matrix).

Liquid crystal layer 30 is sealed in between first substrate 10 and second substrate 20. Specifically, liquid crystal layer 30 is sealed by sealing member 50 formed between first substrate 10 and second substrate 20. Sealing member 50 sealing liquid crystal layer 30 is formed in a frame-like shape along the circumference of first substrate 10 and second substrate 20.

A liquid crystal material forming liquid crystal layer 30 can be appropriately selected according to the driving mode of liquid crystal display panel 1. The thickness of liquid crystal layer 30 is the distance (cell gap) between first substrate 10 and second substrate 20. The thickness of liquid crystal layer 30 is 2 μm to 6 μm, for example, although the thickness is not limited thereto.

The plurality of spacers 40 is provided between first substrate 10 and second substrate 20 to support first substrate 10 and second substrate 20, in order to maintain the distance (cell gap) between first substrate 10 and second substrate 20. In this embodiment, the plurality of spacers 40 is provided on second substrate 20. Specifically, each of the plurality of spacers 40 is formed on a surface of color filter layer 22 of second substrate 20 so as to protrude toward first substrate 10.

Each of the plurality of spacers 40 is a columnar spacer formed by a columnar member. In this embodiment, each spacer 40 has a circular trapezoidal shape, and the upper and lower end faces thereof have a circular shape. Each spacer 40 is made of a resin material, such as an acrylic resin. Therefore, each spacer 40 can be elastically deformed according to the modulus of elasticity of the resin material forming spacer 40. Therefore, even if the surface of first substrate 10 has irregularities, and the cell gap is partially different, the tip end part of spacer 40 can be deformed to conform to the irregularities on the surface of first substrate 10 to maintain a predetermined cell gap. Each spacer 40 can be formed in a predetermined shape by photolithography or the like.

In this embodiment, each of the plurality of spacers 40 is a main spacer that determines the distance between first substrate 10 and second substrate 20, and the tip end part of each spacer 40 is in contact with first substrate 10. Specifically, the tip end part of each spacer 40 is in contact with an alignment film formed on the outermost surface of first substrate 10. Note that the tip end part of each spacer 40 is always in contact with first substrate 10 even when liquid crystal display panel 1 is not pressed in the thickness direction.

As shown in FIG. 3 and FIG. 4, the plurality of spacers 40 serving as main spacers includes two kinds of spacers 40 having different heights, specifically, first spacers 41 and second spacers 42. The plurality of spacers 40 includes a plurality of first spacers 41, and a plurality of second spacers 42 each having a greater height than the first spacers. First spacers 41 and second spacers 42 having different heights can be formed by photolithography using a halftone mask or by performing photolithography using a mask twice. First spacers 41 and second spacers 42 are always in contact with first substrate 10.

The plurality of spacers 40 is arranged over the whole of the image display area of display screen 1*a*. A layout of first spacers 41 and second spacers 42 will be described in detail later.

Although not shown, liquid crystal display panel 1 may further include a plurality of subspacers having a smaller height than the main spacers. As with the main spacers, the plurality of subspacers is formed on second substrate 20, and is made of a resin material, such as an acrylic resin material. Unlike the main spacer, the tip end part of the subspacer is not in contact with first substrate 10 when liquid crystal display panel 1 is not pressed in the thickness direction, although the tip end part of the subspacer comes into contact with first substrate 10 when liquid crystal display panel 1 is pressed in the thickness direction. Therefore, the subspacers can accessorily support first substrate 10 and second substrate 20, so that the cell gap between first substrate 10 and second substrate 20 can be more stably maintained. Note that the main spacers and the subspacers having different heights can be formed by photolithography using a halftone mask or by performing photolithography using a mask twice.

The subspacer and the main spacer may be different not only in height but also area of the end face of the tip end part. For example, the area of the end face of the tip end part of the subspacer may be greater than the area of the end face of the tip end part of the main spacer. Note that the subspacers are arranged over the whole of the image display area of display screen 1*a*, as with the main spacers. For example, the main spacers are formed at intervals of 1 mm to 2 mm in the row direction and the column direction, while the subspacers are formed at smaller intervals than the main spacers.

The main spacer and the subspacer are provided between two adjacent pixels. Specifically, the main spacers and the subspacers are positioned to overlap with the black matrix of the color filter layer of second substrate 20.

Note that, although not shown, liquid crystal display panel 1 has a pair of polarizing plates. The pair of polarizing plates are disposed to sandwich a liquid crystal cell formed by first substrate 10, second substrate 20 and liquid crystal layer 30 disposed therebetween. One of the pair of polarizing plates is provided on first substrate 10, and the other of the pair of polarizing plates is provided on second substrate 20. Specifically, one of the pair of polarizing plate is bonded to an outer surface of first transparent substrate 11, and the other of the polarizing plates is bonded to an outer surface of second transparent substrate 21. The pair of polarizing plates are arranged with the directions of polarization thereof being perpendicular to each other. Note that a retardation plate may be bonded to the pair of polarizing plates.

Backlight 2 is disposed on the rear side of liquid crystal display panel 1 configured as described above. Specifically, backlight 2 is disposed on the side toward the rear surface of liquid crystal display panel 1 so as to be opposed to liquid crystal display panel 1. Backlight 2 emits light toward liquid crystal display panel 1. Specifically, backlight 2 emits white light as illumination light.

In this embodiment, backlight 2 is an LED backlight using a light emitting diode (LED) as a light source. Specifically, backlight 2 is a direct LED backlight having two-dimensionally arranged LED elements. Note that backlight 2 may be of the edge type, rather than the direct type. Backlight 2 may also be formed by a cold cathode tube or the like, rather than the LED.

Backlight 2 has substrate 2*a*, and a plurality of LED elements 2*b* arranged on substrate 2*a*. Substrate 2*a* is a mounting substrate on which LED elements 2*b* are to be mounted. Substrate 2*a* may be a glass epoxy substrate, for example. The plurality of LED elements 2*b* is two-dimensionally arranged on substrate 2*a*. Specifically, the plurality of LED elements 2*b* is arranged in a matrix at predetermined intervals along the horizontal lines of pixels (in the row direction) and the vertical lines of pixels (in the column direction) of liquid crystal display panel 1. In this embodiment, the plurality of LED elements 2*b* are mounted at substantially regular intervals in the row direction and the column direction.

Each LED element 2*b* is an LED light source formed by an LED. In this embodiment, each of the plurality of LED elements 2*b* is a white-light LED light source that emits white light. For example, each LED element 2*b* is an individually packaged light emitting element of the surface mount device (SMD) type, and includes a container (package) made of resin or the like, an LED chip (bare chip) arranged in the container, and a sealing member that seals the LED chip. Specifically, LED element 2*b* is a white-light LED element of the SMD type that emits white light.

In this embodiment, backlight 2 is configured as a surface emitting unit that emits planar uniformly scattered (diffused) light to liquid crystal display panel 1. Therefore, backlight 2 has optical sheet 2*c*, such as a diffusion sheet, a prism sheet, or a polarizing sheet, to make the brightness of the light emitted by the plurality of LED elements 2*b* uniform. Note that optical sheet 2*c* need not be a single sheet and may be formed by a plurality of sheets selected from among the prism sheet, the diffusion sheet, and the polarizing sheet.

Backlight 2 may be an LED backlight capable of local dimming for high dynamic range (HDR), for example. By performing a local dimming control with backlight 2, liquid crystal display device 100 can display a color image of high contrast and high quality.

Frame 3 holds liquid crystal display panel 1 and backlight 2. Frame 3 includes first frame 3*a* and second frame 3*b*.

First frame 3*a* is a backlight chassis that holds backlight 2. Substrate 2*a* of backlight 2 is attached to first frame 3*a*. First frame 3*a* is a metal housing having a recess shape as a whole, and is formed by a metal material having high rigidity, such as a steel plate or an aluminum plate.

Second frame 3b is a panel holding member that holds liquid crystal display panel 1. Second frame 3b is a molded frame made of synthetic resin, although second frame 3b may be made of a metal material.

With liquid crystal module 110 configured as described above, provided that the positions of the upper end and the lower end of liquid crystal layer 30 of liquid crystal display panel 1 placed to stand upright (that is, placed in the vertical orientation) as shown in FIG. 2 are referred to as first position P1 and second position P2, respectively, the distance between first substrate 10 and second substrate 20 of liquid crystal display panel 1 placed in the horizontal orientation as shown in FIG. 3 gradually decreases from first position P1 to second position P2. That is, in the original orientation before liquid crystal display panel 1 is placed upright, liquid crystal display panel 1 is configured so that the distance (cell gap) between first substrate 10 and second substrate 20 gradually decreases from first position P1 to second position P2.

With liquid crystal display panel 1, as described above, the cell gap varies so that the cell gap gradually decreases from first position P1 to second position P2 in the original orientation before liquid crystal display panel 1 is placed upright. In this embodiment, the variation of the cell gap is provided by varying the layout of the plurality of spacers 40.

Figure 5:
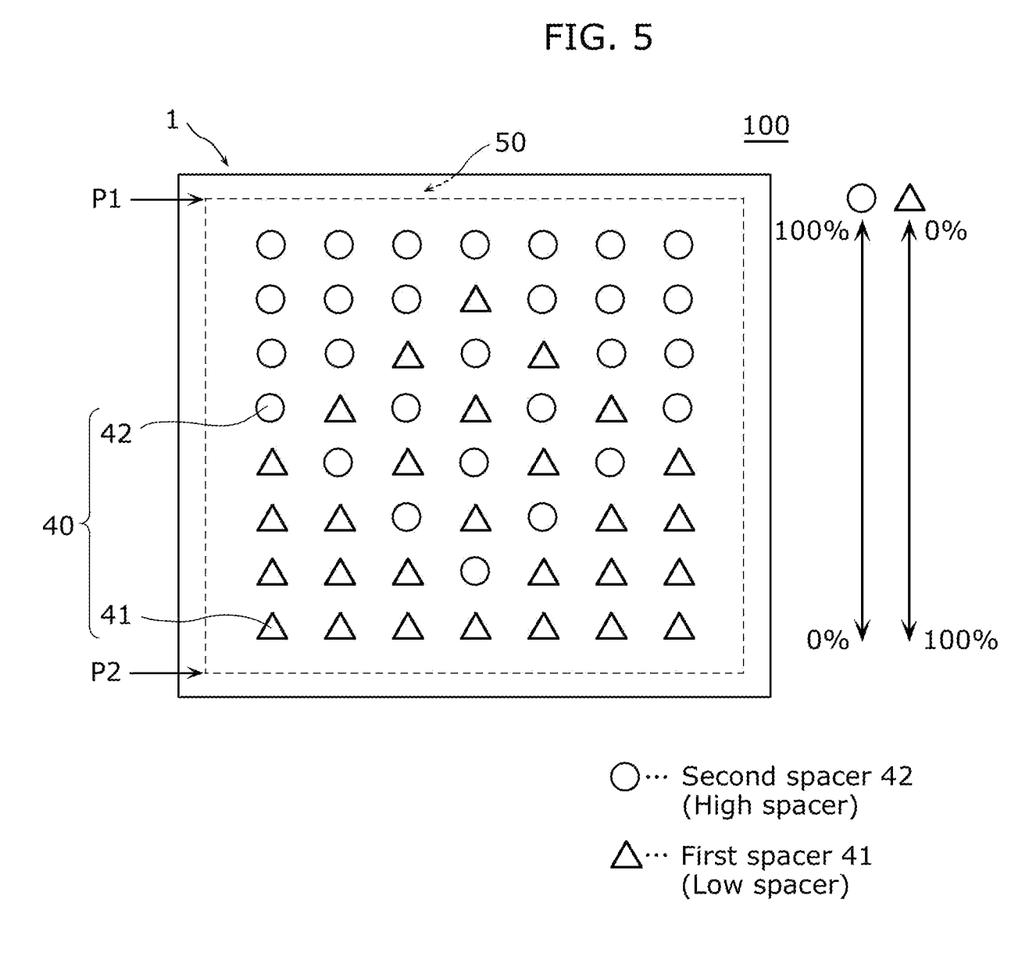
FIG. 5 is a diagram showing a layout of a plurality of spacers in the liquid crystal display panel according to Embodiment 1.

Here, a layout of the plurality of spacers 40 will be described with reference to FIG. 3 and FIG. 4 as well as FIG. 5. FIG. 5 is a diagram showing a layout of the plurality of spacers 40 in liquid crystal display panel 1 according to Embodiment 1.

As described above, the plurality of spacers 40 used in liquid crystal display panel 1 according to this embodiment includes a plurality of first spacers 41 having a smaller height and a plurality of second spacers 42 having a greater height. For example, provided that the height of first spacer 41 is denoted as H1, and the height of second spacer 42 is denoted as H2, $1.03 \leq H2/H1 \leq 1.10$. In this embodiment, $H2/H1=1.05$. That is, the height of second spacer 42 is 5% greater than the height of first spacer 41. Note that the heights of first spacer 41 and second spacer 42 are 3 μm to 4 μm, for example. In this case, the difference in height between first spacer 41 and second spacer 42 is on the order of 0.1 μm to 0.2 μm. All of the plurality of first spacers 41 have the same height, and all of the plurality of second spacers 42 have the same height.

With liquid crystal display panel 1 according to this embodiment, the placement ratio between the two kinds of spacers 40 having different heights, specifically, the placement ratio of second spacers 42 to first spacers 41 varies in the entire image display area of display screen 1a. Specifically, as shown in FIG. 5, in the horizontal orientation of liquid crystal display panel 1, the placement ratio of second spacers 42 to first spacers 41 gradually decreases from first position P1 to second position P2. That is, the ratio of the number of second spacers 42 placed to the number of first spacers 41 placed per unit area in the image display area gradually decreases from first position P1 to second position P2. Note that, as described above, first position P1 is the position of the upper end of liquid crystal layer 30 of liquid crystal display panel 1 placed in the vertical orientation, and second position P2 is the position of the lower end of liquid crystal layer 30 of liquid crystal display panel 1 placed in the vertical orientation.

For example, as shown in FIG. 5, the percentages of second spacers 42 and first spacers 41 are 100% and 0%, respectively, in the position closest to first position P1, and the percentages of second spacers 42 and first spacers 41 are 0% and 100%, respectively, in the position closest to second position P2. In the position in the middle between first position P1 and second position P2, the percentages of second spacers 42 and second spacers 41 are both 50%.

Note that, in FIG. 5, first spacers 41 having a smaller height are represented by triangles (△), and second spacers 42 having a greater height are represented by circles (○). Note that FIG. 5 is a conceptual diagram that only schematically shows the placement ratio between first spacers 41 and second spacers 42, and does not show first spacers 41 and second spacers 42 actually formed.

In this embodiment, the placement density of the plurality of spacers 40 is uniform from first position P1 to second position P2. Specifically, the placement density of all spacers 40 including all first spacers 41 and all second spacers 42 is uniform from first position P1 to second position P2. That is, only the placement ratio between first spacers 41 and second spacers 42 varies, and the placement density thereof does not vary.

Figure 6:
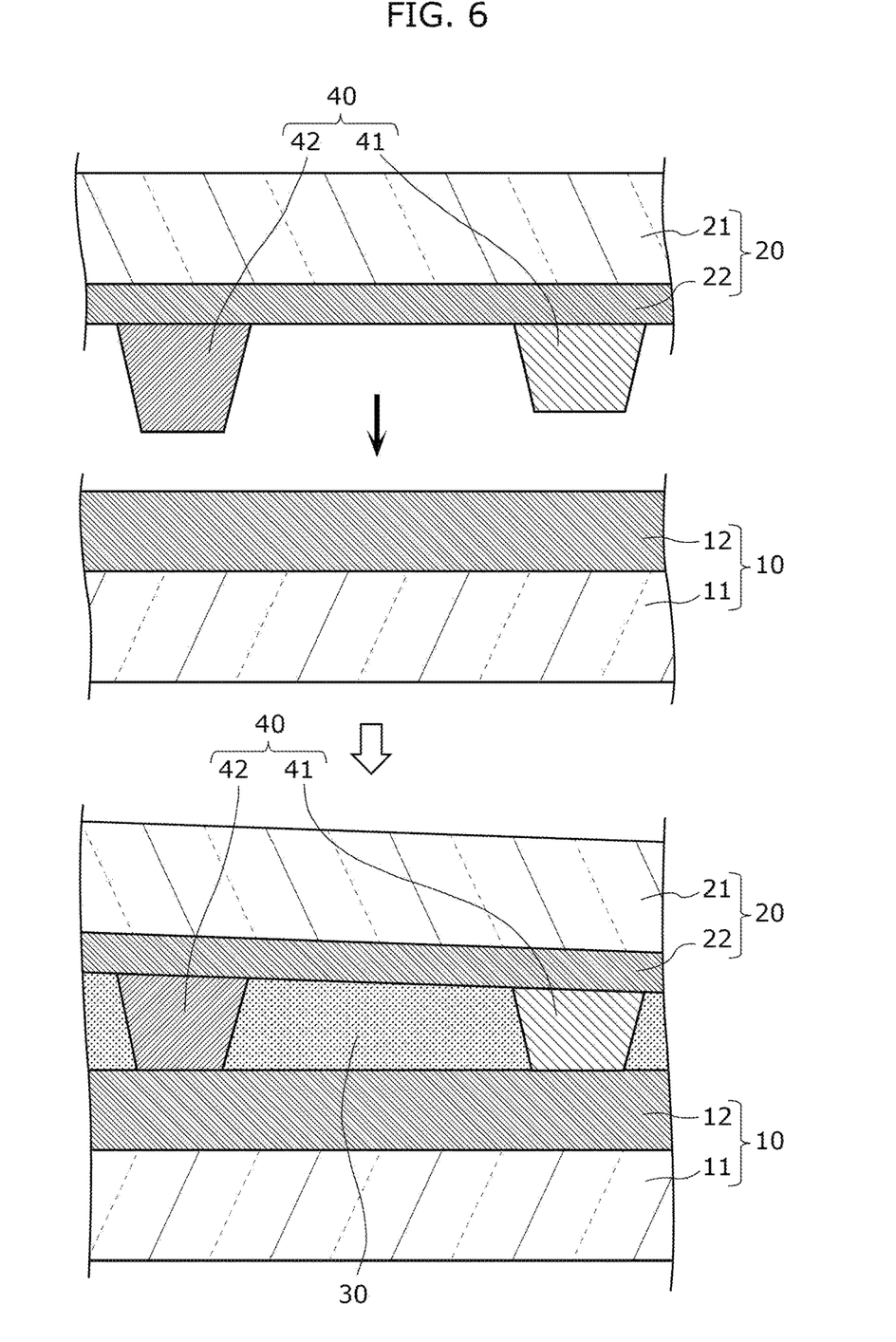
FIG. 6 is a diagram for illustrating a method of manufacturing the liquid crystal display panel according to Embodiment 1.

Next, a method of manufacturing liquid crystal display panel 1 according to Embodiment 1 will be described with reference to FIG. 6. FIG. 6 is a diagram for illustrating a method of manufacturing liquid crystal display panel 1 according to Embodiment 1.

As shown in FIG. 6, first, first substrate 10 including first transparent substrate 11 and TFT layer 12 formed thereon is prepared, and second substrate 20 including second transparent substrate 21 and color filter layer 22 and spacers 40 formed thereon is prepared. Here, as shown in FIG. 5, the plurality of spacers 40 on second substrate 20 are formed in such a manner that the placement ratio of second spacers 42 to first spacers 41 gradually decreases from first position P1 to second position P2.

First substrate 10 and second substrate 20 are bonded to each other by pressing the tip end parts of first spacers 41 and second spacers 42 formed on second substrate 20 against first substrate 10, thereby sealing liquid crystal layer 30 between first substrate 10 and second substrate 20.

Here, since the placement ratio of second spacers 42 to first spacers 41 gradually decreases from first position P1 to second position P2, liquid crystal display panel 1 in the horizontal orientation is configured with the distance between first substrate 10 and second substrate 20 gradually decreasing from first position P1 to second position P2. That is, in liquid crystal display panel 1 placed in the horizontal orientation, second substrate 20 is inclined with respect to first substrate 10.

Figure 7:
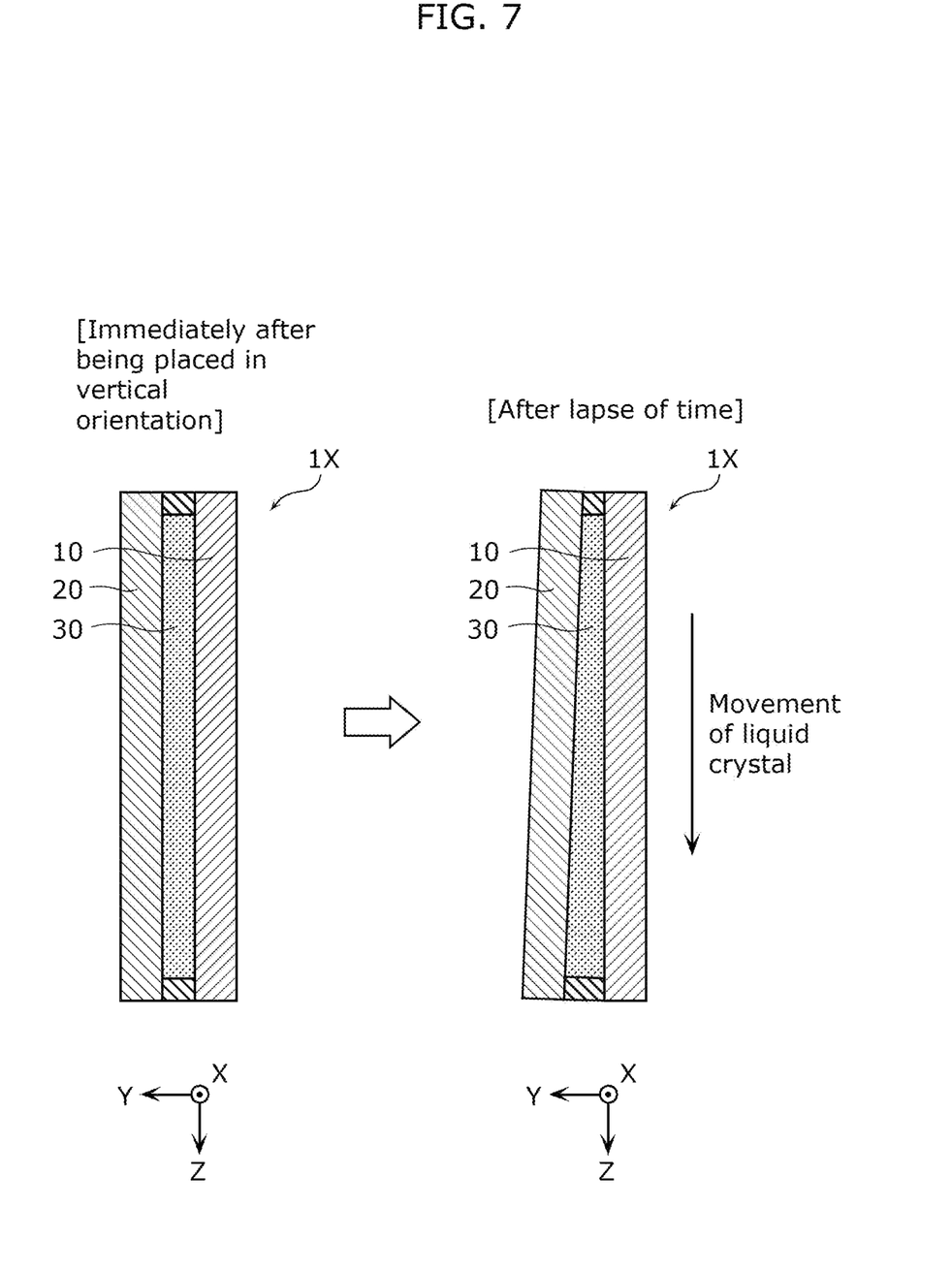
FIG. 7 is a diagram showing a liquid crystal display panel according to a comparative example continuously used in the vertical orientation.
Figure 8:
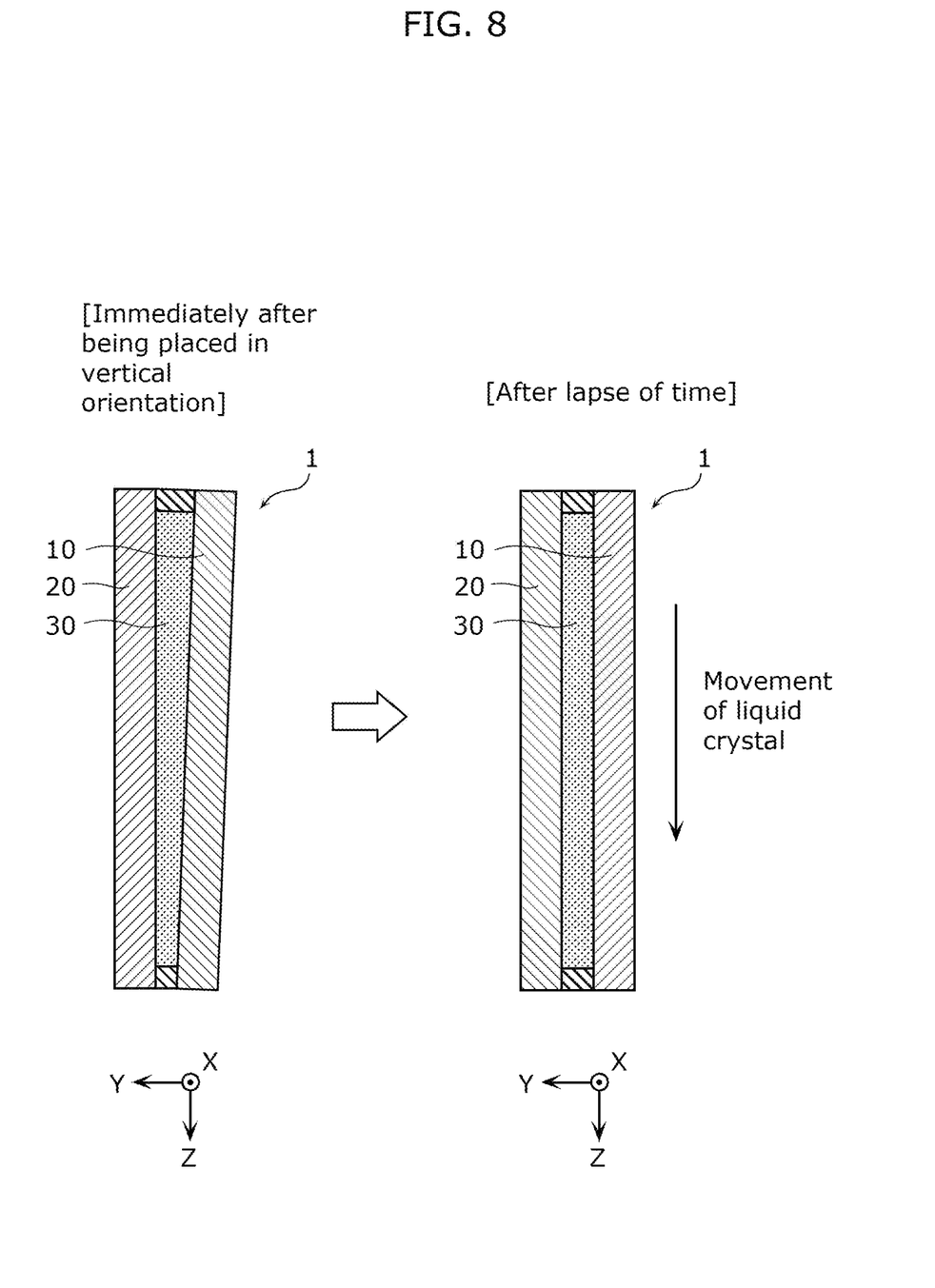
FIG. 8 is a diagram showing the liquid crystal display panel according to Embodiment 1 continuously used in the vertical orientation.

Next, with reference to FIG. 7 and FIG. 8, effects of liquid crystal display panel 1 according to this embodiment will be described by comparing liquid crystal display panel 1 with liquid crystal display panel 1X according to a comparative example. FIG. 7 is a diagram showing liquid crystal display panel 1X according to a comparative example continuously used in the vertical orientation. FIG. 8 is a diagram showing liquid crystal display panel 1 according to Embodiment 1 continuously used in the vertical orientation.

Liquid crystal display panel 1X according to the comparative example shown in FIG. 7 has a plurality of spacers, as with liquid crystal display panel 1 according to this embodiment, although all the spacers have the same height in liquid crystal display panel 1X according to the comparative example shown in FIG. 7. Therefore, in liquid crystal display panel 1X according to the comparative example, the cell gap between first substrate 10 and second substrate 20 does not vary from first position P1 to second position P2 in the horizontal orientation but is uniform over the image display area.

Therefore, when liquid crystal display panel 1X according to the comparative example is placed in the vertical orientation, although the cell gap between first substrate 10 and second substrate 20 is uniform in the vertical direction immediately after liquid crystal display panel 1X is placed in the vertical orientation, the liquid crystal of liquid crystal layer 30 in liquid crystal display panel 1X flows down in the vertical direction by gravity as time passes when liquid crystal display panel 1X is continuously used in the vertical orientation. As a result, with liquid crystal display panel 1X according to the comparative example, the cell gap is greater in lower parts than in upper parts. As a result, a chromaticity variation occurs between upper parts and lower parts of the image displayed on the display screen of liquid crystal display panel 1X.

With liquid crystal display panel 1 according to this embodiment, however, in liquid crystal display panel 1 placed in the horizontal orientation, the cell gap between first substrate 10 and second substrate 20 gradually decreases from first position P1 to second position P2.

Therefore, with liquid crystal display panel 1 according to this embodiment, as shown in FIG. 8, the cell gap between first substrate 10 and second substrate 20 gradually decreases from first position P1 to second position P2, that is, the cell gap varies between upper parts and lower parts immediately after liquid crystal display panel 1 is placed in the vertical orientation. However, if liquid crystal display panel 1 is continuously used in the vertical orientation, the liquid crystal of liquid crystal layer 30 in liquid crystal display panel 1 flows down in the vertical direction by gravity as time passes. As a result, with liquid crystal display panel 1 according to this embodiment, the difference of the cell gap between upper parts and lower parts decreases, and the cell gap between first substrate 10 and second substrate 20 eventually becomes uniform in the vertical direction. In this way, the chromaticity difference between upper parts and lower parts of the image displayed on liquid crystal display panel 1 can be reduced. In other words, in liquid crystal display panel 1 placed in the vertical orientation, the variation of the cell gap due to the flow of the liquid crystal by gravity and the original variation of the cell gap cancel each other, and the net cell gap of liquid crystal display panel 1 is kept uniform.

As described above, with liquid crystal display panel 1 according to this embodiment, the original cell gap before liquid crystal display panel 1 is placed upright has an in-plane variation that is in negative correlation with the variation of the cell gap after liquid crystal display panel 1 is placed upright. As a result, the cell gap becomes uniform after liquid crystal display panel 1 is placed upright. In other words, the cell gap of liquid crystal display panel 1 yet to be placed upright has an in-plane variation in advance so that the cell gap becomes uniform after liquid crystal display panel 1 is placed upright. In this way, the vertical chromaticity difference of the image displayed on liquid crystal display panel 1 can be reduced.

As described above, with liquid crystal display panel 1 according to this embodiment, when liquid crystal display panel 1 is used in the vertical orientation, the chromaticity difference between upper parts and lower parts of the image displayed on liquid crystal display panel 1 can be reduced, and the occurrence of a chromaticity variation in the image displayed on liquid crystal display panel 1 can be prevented.

Furthermore, with liquid crystal display panel 1 according to this embodiment, the plurality of first spacers 41 having a smaller height and the plurality of second spacers 42 having a greater height are used as the plurality of spacers 40, and in the horizontal orientation of liquid crystal display panel 1, the placement ratio of second spacers 42 to first spacers 41 gradually decreases from first position P1 to second position P2.

With this configuration, in the horizontal orientation of liquid crystal display panel 1, the cell gap between first substrate 10 and second substrate 20 can be configured to gradually decrease from first position P1 to second position P2.

Furthermore, with liquid crystal display panel 1 according to this embodiment, the placement density of the plurality of spacers 40 is uniform from first position P1 to second position P2.

With this configuration, by changing the placement ratio of second spacers 42 to first spacers 41 from first position P1 to second position P2, the cell gap between first substrate 10 and second substrate 20 can be smoothly changed from first position P1 to second position P2.

Furthermore, with liquid crystal display panel 1 according to this embodiment, provided that the height of first spacer 41 is denoted as H1, and the height of second spacer 42 is denoted as H2, it is preferable that $1.03 \leq H2/H1 \leq 1.10$.

With this configuration, the cell gap between first substrate 10 and second substrate 20 can be more smoothly changed from first position P1 to second position P2.

Note that, although the placement density of the plurality of spacers 40 is uniform from first position P1 to second position P2 in liquid crystal display panel 1 according to this embodiment, the present disclosure is not limited thereto. That is, the placement density of the plurality of spacers 40 can be changed from first position P1 to second position P2. For example, the placement density of the plurality of spacers 40 may gradually decrease from first position P1 to second position P2.

Embodiment 2

Figure 9:
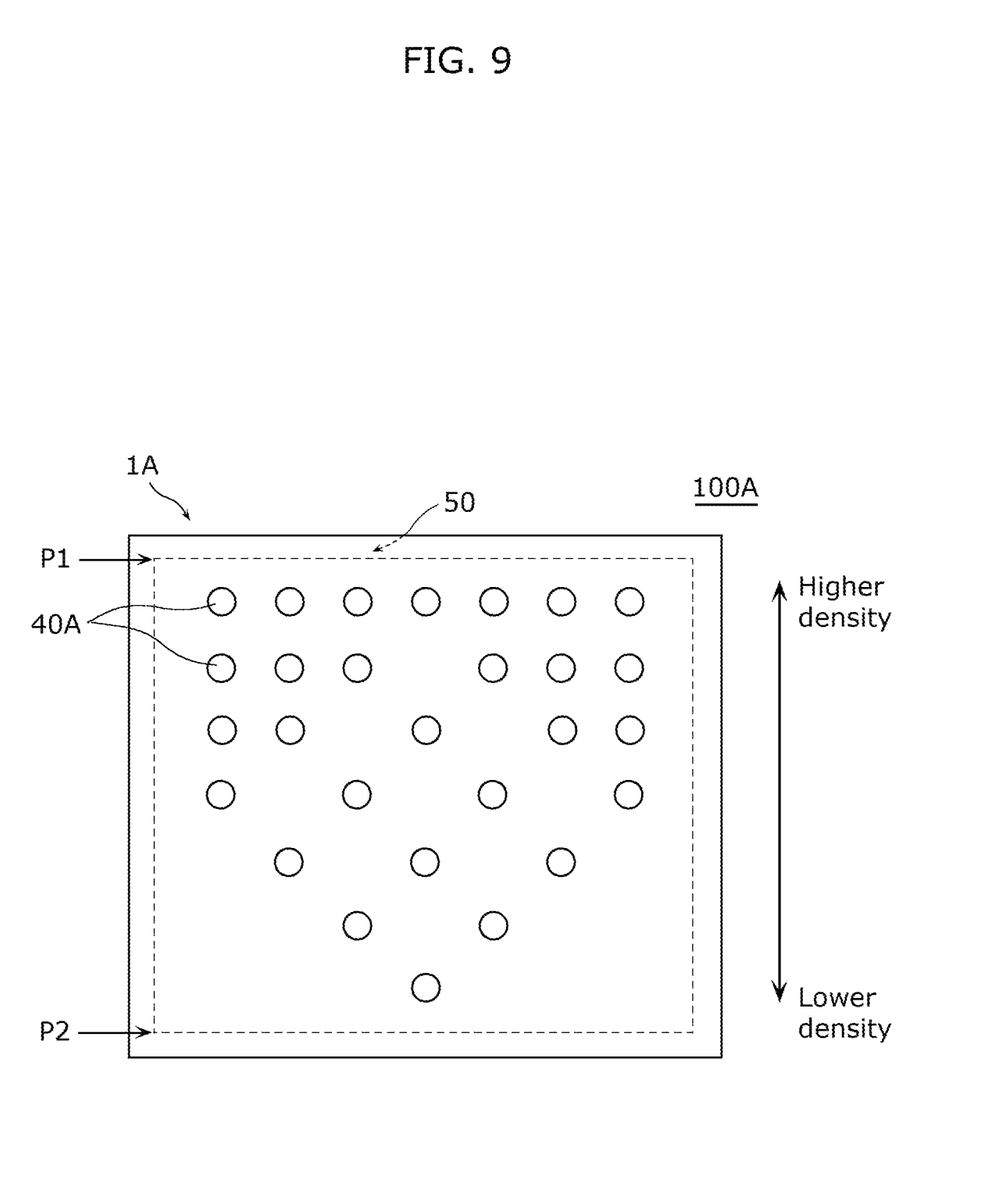
FIG. 9 is a diagram showing a layout of a plurality of spacers in a liquid crystal display panel used in a liquid crystal display device according to Embodiment 2.

Next, liquid crystal display device 100A according to Embodiment 2 will be described with reference to FIG. 9. FIG. 9 is a diagram showing a layout of a plurality of spacers 40A in liquid crystal display panel 1A used in liquid crystal display device 100A according to Embodiment 2. Note that FIG. 9 is a conceptual diagram that only schematically shows the placement density of spacer 40A, and does not show spacers 40A actually formed.

With liquid crystal display panel 1 according to Embodiment 1 described above, two kinds of spacers 40 having different heights are used, and the placement ratio between the two kinds of spacers 40 is changed to change the cell gap between first substrate 10 and second substrate 20 in the horizontal orientation. However, with liquid crystal display panel 1A according to this embodiment, one kind of spacers 40A having the same height are used, and the placement density of spacers 40A is changed to change the cell gap between first substrate 10 and second substrate 20 in the horizontal orientation.

Specifically, as shown in FIG. 9, in the horizontal orientation of liquid crystal display panel 1A, the placement density of a plurality of spacers 40A having the same height gradually decreases from first position P1 to second position P2. That is, in this embodiment, one kind of spacers 40A are used, and the placement density of spacers 40A varies in such a manner that the density of spacers 40A decreases from first position P1 to second position P2. Specifically, as shown in FIG. 9, the density of spacers 40A is the highest in the row closest to first position P1, is the lowest in the row closest to second position P2, and is medium in the row in the middle between first position P1 and second position P2. In this embodiment, again, the height of spacers 40A is 3 µm to 4 µm, for example.

Note that liquid crystal display panel 1A according to this embodiment has the same configuration as liquid crystal display panel 1 according to Embodiment 1 described above except that one kind of spacers 40A is used and except for the layout of spacers 40A. Liquid crystal display panel 1A according to this embodiment can be manufactured in the same method as liquid crystal display panel 1 according to Embodiment 1 described above.

As described above, with liquid crystal display panel 1A according to this embodiment, one kind of spacers 40A having the same height are used, and the placement density of the plurality of spacers 40A gradually decreases from first position P1 to second position P2 in the horizontal orientation of liquid crystal display panel 1A.

With this configuration, as with liquid crystal display panel 1 according to Embodiment 1 described above, in the horizontal orientation of liquid crystal display panel 1, the cell gap between first substrate 10 and second substrate 20 can be configured to gradually decrease from first position P1 to second position P2.

When liquid crystal display panel 1A according to this embodiment is placed in the vertical orientation, the liquid crystal of liquid crystal layer 30 in liquid crystal display panel 1A flows down in the vertical direction by gravity as time passes. As a result, the difference of the cell gap between upper parts and lower parts of liquid crystal display panel 1A decreases, and the cell gap between first substrate 10 and second substrate 20 eventually becomes uniform in the vertical direction. Therefore, when liquid crystal display panel 1A is used in the vertical orientation, the chromaticity difference between upper parts and lower parts of the image displayed on liquid crystal display panel 1A can be reduced, and the occurrence of a chromaticity variation in the image displayed on liquid crystal display panel 1A can be prevented.

Embodiment 3

Figure 10:
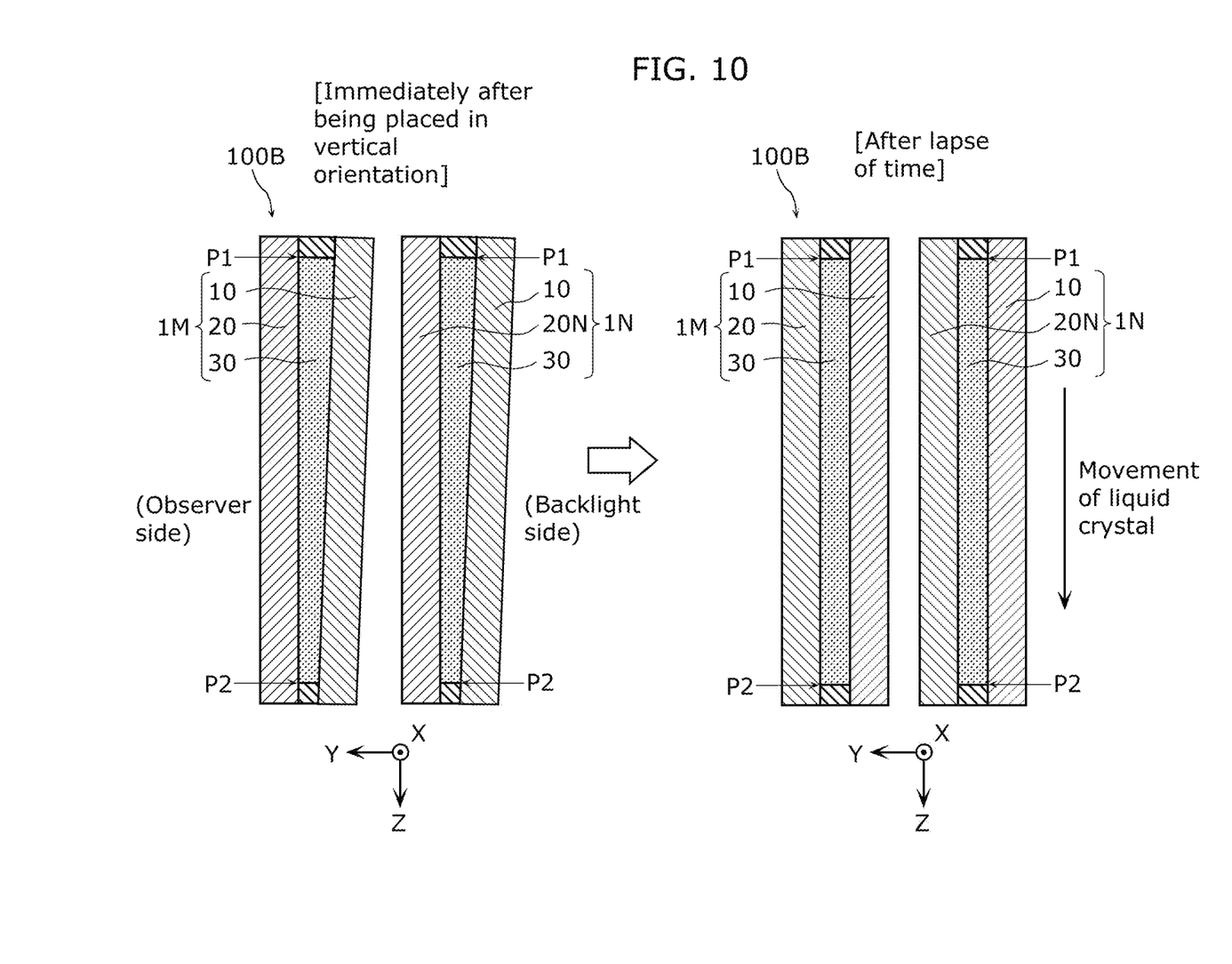
FIG. 10 is a diagram showing a first liquid crystal display panel and a second liquid crystal display panel of a liquid crystal display device according to Embodiment 3 continuously used in the vertical orientation.

Next, liquid crystal display device 100B according to Embodiment 3 will be described with reference to FIG. 10. FIG. 10 is a diagram showing first liquid crystal display panel 1M and second liquid crystal display panel 1N of liquid crystal display device 100B according to Embodiment 3 continuously used in the vertical orientation.

Although liquid crystal display devices 100 and 100A according to Embodiments 1 and 2 include one liquid crystal display panel, liquid crystal display device 100B according to this embodiment includes a plurality of liquid crystal display panels. Specifically, as shown in FIG. 10, liquid crystal display device 100B according to this embodiment has first liquid crystal display panel 1M and second liquid crystal display panel 1N as the plurality of liquid crystal display panels. Therefore, a liquid crystal module of liquid crystal display device 100B according to this embodiment includes first liquid crystal display panel 1M, second liquid crystal display panel 1N, and backlight 2 (not shown).

First liquid crystal display panel 1M and second liquid crystal display panel 1N are overlaid on one another. In this case, first liquid crystal display panel 1M and second liquid crystal display panel 1N may be bonded to each other with an adhesive sheet or the like disposed over the bonding surface thereof, or may be bonded to each other with an adhesive sheet or the like disposed along the circumference thereof with an air layer interposed therebetween. First liquid crystal display panel 1M and second liquid crystal display panel 1N overlaid on one another are held by frame 3.

First liquid crystal display panel 1M is disposed on the front side, which is the observer side, and second liquid crystal display panel 1N is disposed on the side toward backlight 2. That is, second liquid crystal display panel 1N is disposed between first liquid crystal display panel 1M and backlight 2.

First liquid crystal display panel 1M displays a color image, and second liquid crystal display panel 1N disposed on the rear side of first liquid crystal display panel 1M displays a monochromatic image. Specifically, second liquid crystal display panel 1N can display a monochromatic image corresponding to a color image displayed by first liquid crystal display panel 1M in synchronization with the color image. In this way, an image with the black color darkened can be displayed, so that liquid crystal display device 100B can display an image of high contrast.

First liquid crystal display panel 1M and second liquid crystal display panel 1N can be any of liquid crystal display panel 1 according to Embodiment 1 described above and liquid crystal display panel 1A according to Embodiment 2 described above. In this case, since second liquid crystal display panel 1N displays a monochromatic image, second substrate 20N of second liquid crystal display panel 1N does not have color filter layer 22 formed by a color filter and a black matrix, but has a black matrix layer, which does not include the color filter among the color filter and the black matrix, instead of color filter layer 22.

Note that both first liquid crystal display panel 1M and second liquid crystal display panel 1N of liquid crystal display device 100B may display a monochromatic image. In that case, second substrate 20M of first liquid crystal display panel 1M does not have color filter layer 22, as with second liquid crystal display panel 1N.

As described above, as first liquid crystal display panel 1M and second liquid crystal display panel 1N, liquid crystal display device 100B according to this embodiment has liquid crystal display panels having the same configuration as liquid crystal display panel 1 according to Embodiment 1 described above or liquid crystal display panel 1A according to Embodiment 2 described above. Therefore, first liquid crystal display panel 1M and second liquid crystal display panel 1N of liquid crystal display device 100B according to this embodiment are also configured so that the cell gap between first substrate 10 and second substrate 20 gradually decreases from first position P1 to second position P2 in the horizontal orientation.

Therefore, when first liquid crystal display panel 1M and second liquid crystal display panel 1N are each placed in the vertical orientation, the liquid crystal of liquid crystal layer 30 in each of first liquid crystal display panel 1M and second liquid crystal display panel 1N flows down in the vertical direction by gravity as time passes. As a result, the difference of the cell gap between upper parts and lower parts of each of first liquid crystal display panel 1M and second liquid crystal display panel 1N decreases, and the cell gap between first substrate 10 and second substrate 20 eventually becomes uniform in the vertical direction.

Therefore, when first liquid crystal display panel 1M and second liquid crystal display panel 1N are used in the vertical orientation, the chromaticity difference between upper parts and lower parts of the image displayed on each of first liquid crystal display panel 1M and second liquid crystal display panel 1N can be reduced. Therefore, the occurrence of a chromaticity variation between upper parts and lower parts in the image displayed by liquid crystal display device 100B can be prevented.

In particular, when the liquid crystal display device has two liquid crystal display panels, like liquid crystal display device 100B according to this embodiment, as described above, the amount of chromaticity variation is about twice greater than the amount of chromaticity variation of a liquid crystal display device having one liquid crystal display panel. However, by configuring first liquid crystal display panel 1M and second liquid crystal display panel 1N so that the cell gap between first substrate 10 and second substrate 20 gradually decreases from first position P1 to second position P2 in the horizontal orientation, even the chromaticity variation that is twice greater than that of the liquid crystal display device having one liquid crystal display panel can be substantially eliminated. That is, the technique according to the present disclosure is particularly advantageous for a liquid crystal display device having a plurality of liquid crystal display panels, like liquid crystal display device 100B according to this embodiment.

Note that, in this embodiment, first liquid crystal display panel 1M and second liquid crystal display panel 1N can be any of liquid crystal display panel 1 according to Embodiment 1 described above and liquid crystal display panel 1A according to Embodiment 2 described above. For example, both first liquid crystal display panel 1M and second liquid crystal display panel 1N may be liquid crystal display panel 1 according to Embodiment 1 described above or liquid crystal display panel 1A according to Embodiment 2 described above. Alternatively, one of first liquid crystal display panel 1M and second liquid crystal display panel 1N may be liquid crystal display panel 1 according to Embodiment 1 described above, and the other of first liquid crystal display panel 1M and second liquid crystal display panel 1N may be liquid crystal display panel 1A according to Embodiment 2 described above. Alternatively, although the effectiveness is reduced to half, one of first liquid crystal display panel 1M and second liquid crystal display panel 1N may be liquid crystal display panel 1 according to Embodiment 1 described above or liquid crystal display panel 1A according to Embodiment 2 described above, and the other of first liquid crystal display panel 1M and second liquid crystal display panel 1N may be liquid crystal display panel 1X according to the comparative example.

Note that the present disclosure is particularly notably advantageous for a liquid crystal display device that displays a monochromatic image. This is because the chromaticity variation of a liquid crystal display panel that displays a monochromatic image cannot be compensated for, although the chromaticity variation of a liquid crystal display panel that displays a color image can be compensated for by LUT adjustment. That is, the present disclosure, which allows adjustment of the chromaticity difference of a liquid crystal display device by adjustment of the cell gap of a liquid crystal display panel, is particularly useful for a liquid crystal display device that displays a monochromatic image whose chromaticity difference is difficult to adjust. Variations Although liquid crystal display devices, liquid crystal modules, liquid crystal display panels, and so on, have been described based on exemplary embodiments, the present disclosure is not limited to the foregoing exemplary embodiments.

For example, forms obtained by various modifications to the foregoing embodiments which may be conceived by a person of skill in the art and forms realized by combining structural components and functions in the respective embodiments without departing from the essence of the present disclosure are included in the present disclosure.

The invention claimed is:

1. A liquid crystal display panel to be used in a vertical orientation, the liquid crystal display comprising:
   a first substrate;
   a second substrate located opposite to the first substrate;
   a liquid crystal layer disposed between the first substrate and the second substrate; and
   a plurality of spacers for maintaining the distance between the first substrate and the second substrate,
      wherein when a position of a top end of the liquid crystal layer is defined as a first position and a position of a bottom end of the liquid crystal layer is defined as a second position when the liquid crystal display panel is placed in the vertical orientation:
         a distance between the first substrate and the second substrate when the liquid crystal panel is in a horizontal orientation gradually decreases from the first position to the second position,
         the plurality of spacers include first spacers and second spacers having a height greater than a height of the first spacers,
         a placement ratio of the second spacers to the first spacers when the liquid crystal display panel is in the horizontal orientation gradually decreases from the first position to the second position, and
         a placement density of the plurality of spacers is constant from the first position to the second position.

2. The liquid crystal display panel according to claim 1, wherein when the height of the first spacers is denoted as H1 and the height of the second spacers is denoted as H2:
   $1.03 < H2/H1 \leq 1.10$ is satisfied.

3. A liquid crystal module, comprising:
   the liquid crystal display panel according to claim 1; and
   a backlight disposed behind the liquid crystal display panel, wherein
      the liquid crystal display panel comprises a plurality of liquid crystal display panels,
      the plurality of liquid crystal display panels includes a first liquid crystal display panel and a second liquid crystal display panel disposed between the first liquid crystal display panel and the backlight,
      the first liquid crystal display panel displays a colored image, and
      the second liquid crystal display panel displays a monochromatic image.

4. A liquid crystal module, comprising:
   the liquid crystal display panel according to claim 1; and
   a backlight disposed behind the liquid crystal display panel, wherein
      the liquid crystal display panel comprises a plurality of liquid crystal display panels,
      the plurality of liquid crystal display panels includes a first liquid crystal display panel and a second liquid crystal display panel disposed between the first liquid crystal display panel and the backlight,
      the first liquid crystal display panel displays a monochromatic image, and
      the second liquid crystal display panel displays a monochromatic image.

5. A liquid crystal display panel to be used in a vertical orientation, the liquid crystal display comprising:
- a first substrate;
- a second substrate located opposite to the first substrate;
- a liquid crystal layer disposed between the first substrate and the second substrate; and
- a plurality of spacers for maintaining the distance between the first substrate and the second substrate, wherein
  - when a position of a top end of the liquid crystal layer is defined as a first position and a position of a bottom end of the liquid crystal layer is defined as a second position when the liquid crystal display panel is placed in the vertical orientation:
    - a distance between the first substrate and the second substrate when the liquid crystal panel is in a horizontal orientation gradually decreases from the first position to the second position,
    - the plurality of spacers are spacers of a single type having same height, and
    - a placement density of the plurality of spacers when the liquid crystal display panel is in the horizontal orientation gradually decreases from the first position to the second position.

6. The liquid crystal display panel according to claim 1, wherein
- the first substrate includes a thin-film transistor provided to each of a plurality of pixels,
- the second substrate includes a color filter, and
- the plurality of spacers are provided in the second substrate.

7. The liquid crystal display panel according to claim 1, wherein
- each of the plurality of spacers is a main spacer that is in contact with each of the first substrate and the second substrate, and
- the liquid crystal display panel further comprises a plurality of subspacers having a height less than a height of the main spacers.

8. A liquid crystal module, comprising:
- the liquid crystal display panel according to claim 5; and
- a backlight disposed behind the liquid crystal display panel, wherein
  - the liquid crystal display panel comprises a plurality of liquid crystal display panels,
  - the plurality of liquid crystal display panels includes a first liquid crystal display panel and a second liquid crystal display panel disposed between the first liquid crystal display panel and the backlight,
  - the first liquid crystal display panel displays a colored image, and
  - the second liquid crystal display panel displays a monochromatic image.

9. A liquid crystal module, comprising:
- the liquid crystal display panel according to claim 5; and
- a backlight disposed behind the liquid crystal display panel, wherein
  - the liquid crystal display panel comprises a plurality of liquid crystal display panels,
  - the plurality of liquid crystal display panels includes a first liquid crystal display panel and a second liquid crystal display panel disposed between the first liquid crystal display panel and the backlight,
  - the first liquid crystal display panel displays a monochromatic image, and
  - the second liquid crystal display panel displays a monochromatic image.

* * * * *